United States Patent

[11] 3,618,629

[72] Inventors William T. Heyer
 225 Mohawk Road;
 Dale F. Soukup, 318 Mohawk Road, both of Santa Barbara, Calif. 93105
[21] Appl. No. 880,199
[22] Filed Nov. 26, 1969
[45] Patented Nov. 9, 1971

[54] BALLCOCK VALVE
 20 Claims, 9 Drawing Figs.

[52] U.S. Cl. .................................................. 137/218, 137/413, 251/43, 251/63.5, 251/357
[51] Int. Cl. ............................................... F16k 21/18
[50] Field of Search .......................................... 137/218, 413; 251/43, 63, 63.5, 357

[56] References Cited
UNITED STATES PATENTS

| 212,704 | 2/1879 | Jennings | 251/43 |
|---|---|---|---|
| 226,224 | 4/1880 | Demarest | 137/413 |
| 1,535,562 | 4/1925 | Atkins | 251/43 X |
| 2,103,503 | 12/1937 | White | 251/357 X |
| 2,655,172 | 10/1953 | Owens | 137/413 |
| 3,242,940 | 3/1966 | Sirotek | 137/218 |

FOREIGN PATENTS

| 54,139 | 1890 | Germany | 251/43 |
|---|---|---|---|

Primary Examiner—Robert G. Nilson

ABSTRACT: A ballcock valve for controlling the flow of water from an inlet pipe to a tank, which valve includes an inlet seat at which the flow of water is controlled. A body attached to the inlet pipe bounds an internal cavity which is divided by a piston assembly into a bias chamber and a flow chamber. A seal is carried by the piston to engage the inlet seat, and is moved toward and away from the seat to close and to open the inlet port. A bias port bypasses or extends from end-to-end of the piston element so as to conduct inlet pressure to the bias chamber. A vent port which can be opened and closed by mechanism associated with the level of the water of the tank controls the pressure within the bias chamber. The piston assembly is a unitary conveniently removable and replaceable element with a cup-shaped member restrained laterally at its base by a rim. An outlet port extends through the wall of the body to provide for flow of water from the flow chamber to the tank. In one embodiment of the invention an antisiphon skirt surrounds the body so as to block siphoning backflow while admitting air to regions subject to said siphoning flow so as to prevent the same.

PATENTED NOV 9 1971

INVENTOR.
WILLIAM T. HEYER,
DALE F. SOUKUP
BY
Angus & Mon
ATTORNEYS.

BALLCOCK VALVE

This invention relates to a ballcock valve which is efficient in operation, inexpensive to manufacture, relatively small in size, and readily disassembled and reassembled for purposes of repair.

Ballcock valves have been the subject of extensive development over the years in view of their extensive demand. They have widespread utility in maintaining water levels in tanks, particularly in toilet tanks. Their objective is to receive water from an inlet port and to control its flow into the tank and to shut off the supply of water when the water level reaches a desired elevation in the tank.

The most frequently encountered prior art ballcock valve utilizes a seal which is mechanically forced to its closed position by a pivoted arm whose position is responsive to the water level. Such valves are readily held open by particulate foreign matter in the water, and also have the disadvantage of needing to be made relatively large in order to secure the mechanical advantage necessary to overcome the forces developed by the pressure of the inlet water.

Another commonly encountered prior art ballcock valve utilizes diaphragms which are moved toward and away from a valve seat so as to open and close the same by virtue of differential pressure applied across the diaphragm. These have the disadvantages that they are subject to fatigue failure from repeated cycling, and to rapid wear and abrasion by water flow. They ultimately tend to blow out or balloon, destroying the valve function.

Furthermore, both classes of prior art devices customarily move their seals only a few thousandths of an inch in order fully to open the valve. Water flows past these seals through such a small orifice at a high velocity, and this causes substantial wear on the seals and results in their early failure, especially when the water carries a load of sand.

It is an object of this invention to provide a ballcock valve which can be constructed of minimum size, whose operation is piloted by opening and closing a vent port, which utilizes a piston element instead of the diaphragm or other flexible construction so that the opening of the valve can be a wide one with a lower water velocity, and wear on the seals is minimized.

It is another object of this invention to provide the piston element in a unitary construction which is readily removed and replaced in field service so that maintenance of the valve in the field is a simple matter.

A ballcock valve according to this invention utilizes an inlet pipe having an inlet seat mounted to it at its terminating end. A body is attached to the inlet pipe which has an internal cavity in fluid communication with the inlet seat. This cavity is at least partially bounded by a cylindrical wall that is aligned with its axis normal to the plane of the inlet seat. This cylindrical wall bounds a portion of said cavity. A piston element makes a sliding, fluid sealing contact with the cylindrical wall.

This piston element is an integral structure which moves freely in the cavity and divides the cavity into a bias chamber on the side of the piston element away from the inlet seat, and a flow chamber adjacent to the seat. A seal is carried by the piston element and is adapted to make a fluid sealing contact with the inlet seat in one position so as to close the valve, and to move away from the same to another position to permit flow therethrough. A vent port passes through the body and enters the bias chamber, and a bias port fluidly interconnects two ends of the piston element so as to provide system pressure to the bias chamber.

Control means is adapted to open and close the vent port to change its pressure and provide for piloted actuation of the ballcock valve.

An inlet port pierces the wall of the body to provide for outflow of water from the flow chamber, and if desired a hush tube may surround the body and the inlet pipe so as to guide the water downwardly into the tank and reduce the noise of its flow.

According to a preferred but optional feature of the invention, the piston element is comprised of a poppet device which includes a stem to which a cup-shaped flange is retained. A peripheral hoop means is provided on the poppet for radially restraining the base of the cup-shaped flange member. A flange of this member makes the fluid sealing sliding fit.

According to still another preferred but optional feature of the invention, an external complementary surface is provided on the poppet and in the wall of the cavity which are adapted to engage so as to limit the upward travel of the piston element, and also to aid in excluding particulate matter from the bias chamber.

According to still another preferred but optional feature of the invention, an antisiphon sleeve is attached to one region of the body and elastically embraces another region downstream therefrom so as to block reverse-siphoning flow of water into the flow chamber from the tank.

The above and other features of this invention will be fully understood from the following detailed description and the accompanying drawings in which.

Figure 1:
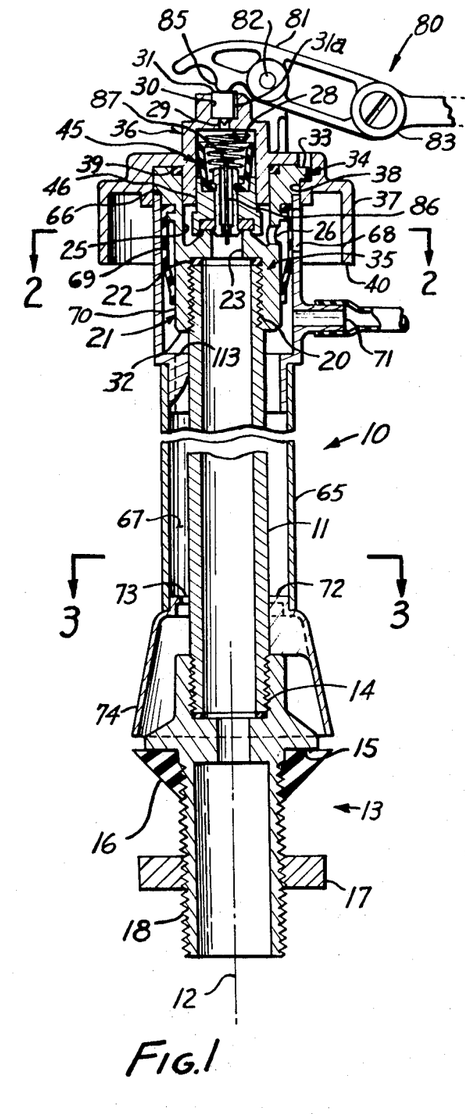
FIG. 1 is an axial cross section of the presently preferred embodiment of the invention.
Figure 2:
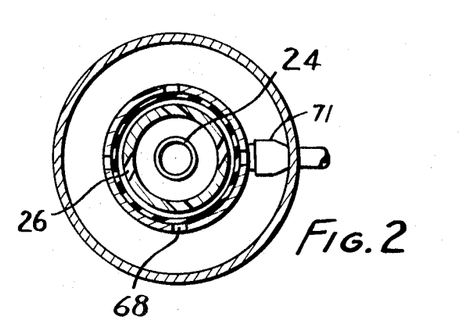
FIGS. 2 and 3 are cross sections taken at lines 2—2 and 3—3, respectively, of FIG. 1.
Figure 3:
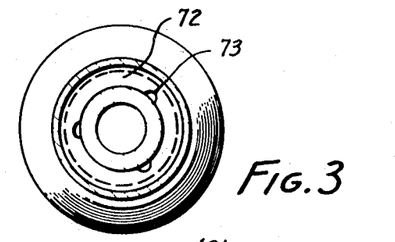

The presently preferred embodiment of ballcock valve 10 is shown in FIG. 1. It includes an inlet pipe 11 having a nominal axis 12 which is usually placed vertically relative to the surface of a pool of water such as in a toilet tank. For usages such as in toilet tanks, a mounting adapted 13 is provided which is threadedly engaged to the lower end of the inlet pipe by threads 14. It has a shoulder 15 which bears against the top surface of a rubber gasket 16, which gasket is pulled against the bottom of the tank so as to close the boundary of a hole therethrough. A nut 17 pulls the valve down, the nut being threaded to thread 18, and bearing against the bottom of the tank. The hole in the bottom of the tank is thereby sealed closed, and the valve is held rigidly in place.

The inlet pipe rises to an upper end which has an external thread 20 by means of which a body 21 is attached to it. A washer 22 seals between the body and the upper end of the tube, and the body includes an inlet port 23 which forms a continuation of the inlet pipe and is sometimes referred to herein as the termination point of the inlet pipe.

Figures 5, 6, 7, 8, 9:
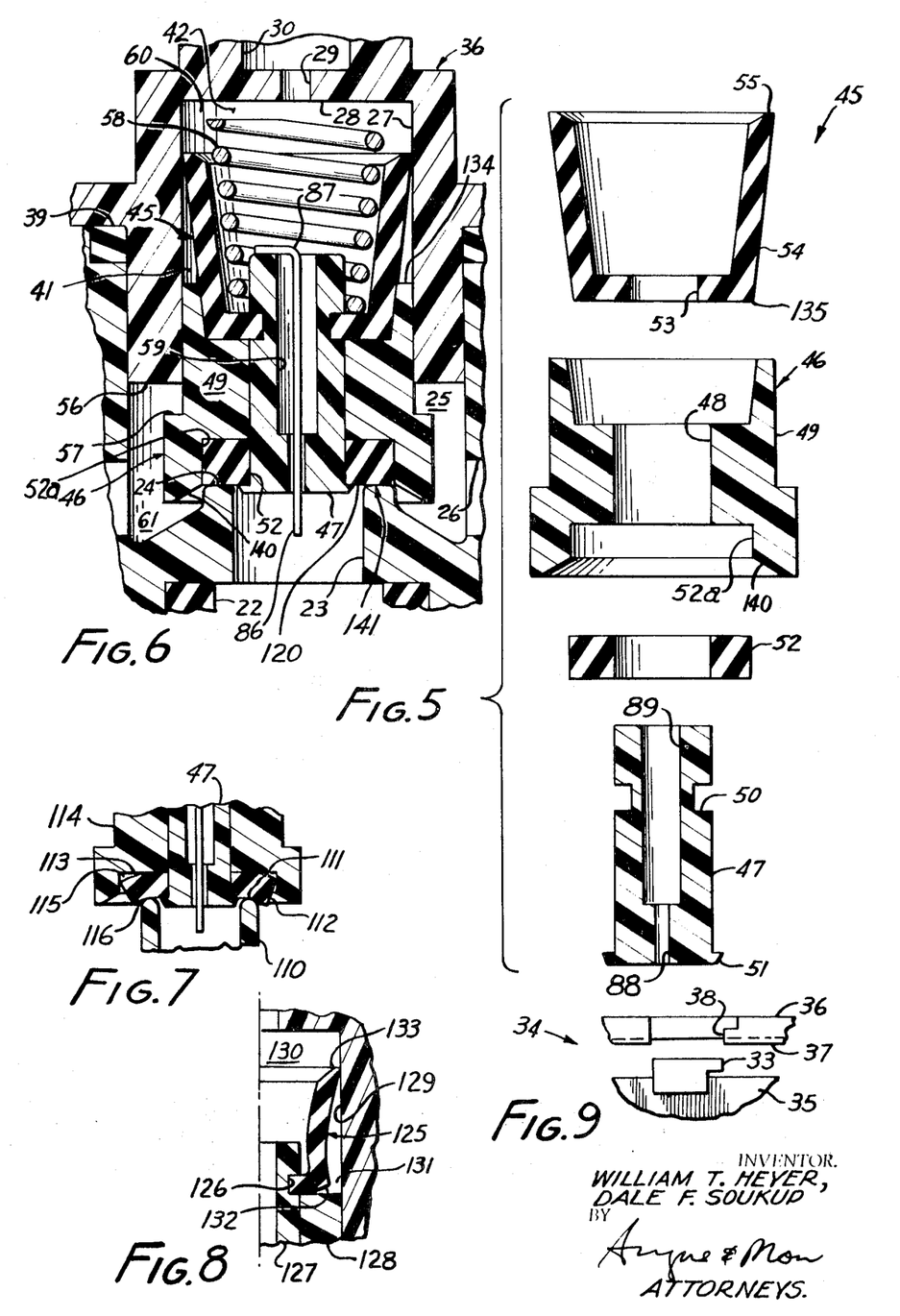
FIG. 5 is an exploded view of a piston element useful in the valves of FIGS. 1 and 4.
FIG. 6 is an enlarged axial cross section of a portion of FIG. 1.
FIGS. 7 and 8 are fragmentary cross sections showing disadvantages of the prior art.
FIG. 9 is a fragmentary elevation showing means useful in assembling the valve.

The inlet port is surrounded by an inlet seat 24 (see FIG. 6) which is annular and has a plane which is disposed horizontally in FIGS. 1 and 6. A cavity 25 is formed inside the body, and an outlet port 26 passes through the wall thereof. Near the upper end of the body there is a cylindrical wall 27 which partly bounds the cavity and which serves as a cylinder for purposes yet to be described.

At the upper end of the cavity there is an upper wall 28 which closes the upper end of the cavity. A vent port 29 passes through the upper wall to communicate with the atmosphere. Above the vent port, and connecting therewith, is a sink 30 having a reciprocable valve plunger 31 disposed therein. A slot 31a is formed along the outer wall of the plunger so as to create a fluid passage past the wall of the plunger.

A neck 32 is formed on the body and is threaded to thread 20 on the inlet pipe. A plurality of projecting lugs 33 on the body form portions of a bayonet coupling 34 (see FIG. 9) of the general type shown in U.S. Pat. No. 3,389,887, issued June 25, 1968 to Antunez entitled, "Float Valve."

The body is formed of a lower portion 35 and an upper portion 36. The upper portion carries the cylindrical wall 27 and includes an overhanging flange 37 with complementary lugs 38 for engagement with lugs 33 of the bayonet coupling (see FIG. 9). A sealing ring 39 fits between the two portions when they are joined. Cavity 25 is closed by the engagement of the two portions of the body. The upper portion of the body includes an overhanging skirt 40, which is downwardly directed.

Piston assembly 45 is shown in full detail in FIGS. 5 and 6. It includes a poppet 46 that is formed of two portions. A first of said portions is a stem 47 and the other is a base member 49 having a hole 48 therethrough to pass the stem 47. A retention groove 50 is formed around the periphery of the stem and a head 51 is formed on the stem at its lower end. The head underlays and holds in place a flat annular resilient inlet seal 52 which faces toward the inlet seat and is adapted to close the same. The relative dimensions of the seat and of the seal will be more fully discussed below. The seal makes a close fit with wall 52a of base portion 49 and with stem 47. Because it is resilient, the seal may be snapped over head 51 so as to make the said tight fit.

The piston assembly is held assembled by snapping an internal shoulder 53 of a cup-shaped flange member 54 into retention groove 50. Additional features of this flange member and of its mounting will be described in greater detail below. At this point, it is only necessary to note that the flange member extends outwardly and away from the stem, and that its trailing edge makes a sliding fluid sealing fit with cylindrical wall 27. The contact line between the cylindrical wall 27 and the trailing edge of the flange member serves as a seal which divides the internal cavity into a bias chamber 42 and a flow chamber 41. The bias chamber is disposed on the side of the piston element away from the inlet port, and the flow chamber is on the side adjacent to it.

Complementary shoulders 56, 57 are formed respectively on the upper portion of the body and on the outside of base member 49. Their abutment limits the upward excursion of the piston member. Also, when they abut they substantially close the path around the piston assembly against passage of particulate matter into the bias chamber. This excludes dirt, sand and grit therefrom, improves the operation of the valve, and increases the life of its parts.

A bias spring 58 is disposed in the bias chamber where it is opposed between upper wall 28 and the inside of the cup-shaped flange. This spring presses the piston assembly downwardly. Preferably, but not necessarily, it is somewhat shorter than that axial spacing which will exist between the upper wall and the portion of the flange member which it contacts when the valve is in its closed position. When the device is used in systems operating at low pressure, it may occur that the sum of the forces derived from friction of the piston and from the spring force which exists at the closed position, could be sufficient to prevent the opening of the valve. Under such circumstances, initial movement of the piston element might be prevented. When the bias spring is somewhat shorter than that distance, there will be an initial free movement of the piston element resisted only by the friction force, and the valve will open at a lower system pressure. However, a spring bias may be provided under all conditions if desired, by making the bias spring of sufficient length to exert the same.

A bias port 59 extends from end to end of the piston element. It passes through the stem and fluidly connects the inlet pipe and bias chamber 41 at all times.

In order to reduce the noise of operation of this device, it is desirable to discharge water into water, and for this reason, a hush tube 65 is provided which projects from body 21 downwardly around the inlet pipe to an elevation well below the expected water level in the tank. Its upper end 66 is held between the two portions of body 21. As it extends downwardly it leaves an annular space 67 between it and the outside of the inlet pipe. Air ports 68 pass through the wall of the hush tube at an elevation about even with that of outlet port 26.

An antisiphon skirt 69 is clamped skirt the body above the outlet port and extends downwardly as it tapers inwardly so as to contact a cylindrical outer wall portion 70 of the body. This skirt is resiliently flexible and elastic, and water under pressure flowing from the outlet ports will stretch it outwardly so that water will flow down into the hush tube. However, should a negative pressure develop in the inlet port, the natural resiliency of the antisiphon skirt and the reversed pressure differential will cause the skirt to clamp onto wall portion 70 so as to close the passage and break the siphoning flow.

A fill tube 71 is connected to the hush tube below the antisiphon device and makes fluid communication with annular space 67. It leads to the commode, and is provided for the purpose of discharging a quantity of water into the commode after the flushing action is completed and before the tank has been refilled. The antisiphon device is optional. Spacer members 72 support the hush tube around the inlet pipe. They are angularly are angularly spaced apart and leave restricted water passages 73 between them. These tend to keep the upper portion of the hush tube full of water during the operation so that water flows into water, and the noise in the hush tube is minimized. The hush tube is continued downwardly where it abuts a spray deflector 74 which shrouds the region where the water splashes downwardly with its greatest force and quiets the action of the system by reducing turbulence in the tank.

It will be noted that the downwardly extending overhanging flange 37 shrouds and protects air ports 68.

Control means 80 comprises a lever 81 which is mounted by a hinge 82 to the upper portion of the body for rotation around the horizontal axis. An adjustment knuckle 83 connects a float 84 to the left-hand portion of the lever and permits adjustment of the height of the float relative to the valve body. This knuckle has the additional feature that it permits the float to be moved down alongside the hush tube when the valve is shipped so that the valve can be placed in a relatively small box and is less exposed to damage during shipment.

The left-hand portion of the lever in FIG. 1 includes a contactor 85 which is adapted to press downwardly on the top of valve plunger 30. When the float is raised up to the position of FIG. 1, the plunger is forced downwardly and closes the vent port. When the water level drops the float lowers and this motion will lift the lever. Water pressure will then force the valve plunger upwardly in a manner yet to be described, so as to open vent port 29.

Referring again to FIGS. 5 and 6, further attention is called to bias port 59. The flow area of this port is of considerable importance to the operation of this valve. If the port is too large sudden surges of water can occur therethrough and the operation of the valve will be entirely too abrupt. If too small, then the operation is unreliable. Furthermore, it is necessary to keep this port clean so that its size remains sensibly constant in environments where silting up and encrustation are constant possibilities. Also, to make small passages long, of course increases the friction opposing flow of the fluid and increases the pressure drop. Accordingly, the bias passage is formed in two parts which are of different diameters. One portion 88 is of relatively small bore and another portion 89 is of relatively larger bore, and means is provided to keep it clean. It is quite possible to make the short small bore quite accurate in diameter and to minimize the pressure drop across the same. A wire 86 is placed in the bias port and extends from end to end thereof, this wire having a bend 87 to keep the wire from falling out. The wire has a lesser diameter than that of bore 88 and can be carefully measured, as it wiggles around during turbulent flow, it keeps the bias passage clean. The size of bore 88 and the size of the wire can readily be closely controlled so that the net size of the port is readily obtained in production operations and kept clean.

One embodiment of float 84 is shown in FIG. 1. It may simply be an inverted open cup which traps air in its lowermost position. Optionally, the cup may be filled with foam or the float may be a foam ball with or without skin coating.

The float is shown in FIG. 1 having a plastic insert retained by a retainer ring 145. Both the retainer ring and the float may be deleted if desired and simply the buoyant effect of the air trapped within the cup portion 146 may be relied upon for the operation of the device. However, the problem exists of solubility of the air in the water in the tank such that the use of entrapped air may lead to some undesired quick cycling from time to time. Accordingly, the plastic insert 147 will customarily be provided.

Figure 4:
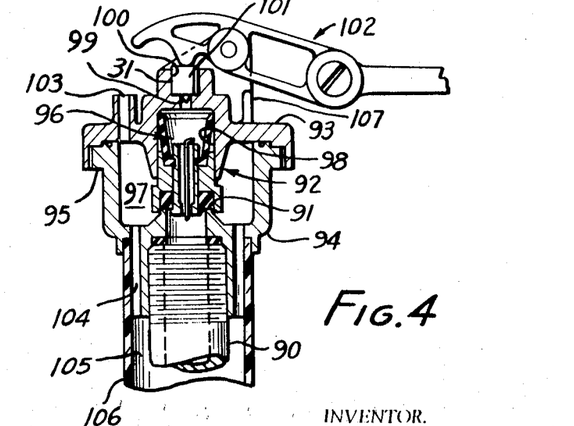
FIG. 4 is a fragmentary, axial cross section of another embodiment of the invention.

FIG. 4 shows still another embodiment of the invention. In this embodiment there is no antisiphon device. An inlet pipe 90 rises to an inlet seat 91 at which point a body 92 is attached. The body has an upper portion 93 and a lower portion 94. These are held together by a bayonet joint of the type shown in FIG. 9 or in the aforesaid Antunex patent. If preferred, the body portions in either embodiment may be joined by different types of joiners such as headed screws threaded into one of the portions and passing through the other.

A piston element 96 identical in all particulars to that which is shown in FIGS. 1, 6 and 9 is placed inside cavity 97 and makes a sliding fluid sealing contact with a cylindrical wall 98 as before. Also as before, a vent port 99 rises into a sink 100 in which a valve plunger 101 is placed subject to abutment by control means 102.

A fill tube 103 departs from cavity 97 to the commode. A plurality of outlet ports 104 discharge from the cavity into the annular spacing 105 between hush tube 106 and the outside of the inlet pipe. It will be noted that this is a much-simplified version of the device of FIG. 1, principally in its elimination of the antisiphon device which is not required by many building codes.

Certain pertinent details of construction of the piston element will be discussed after a preliminary disclosure of the operation of the valves. These additional details are more meaningful in view of the mode of operation. The operation of the device of FIG. 1 will be described in detail, bearing in mind that the operation of the device in FIG. 4 is entirely analogous to it.

When the ballcock valve is connected to a source of inlet pressure, there is no particular position which will necessarily be taken by the valve. It might be either open or closed, but this will immediately be determined by the position of the control means 80 relative to the body. If the lever 81 is at its most counterclockwise extreme, then the valve plunger 31 will be pressed down to close vent port 29. Accordingly, inlet pressure which is passed by the bias port to the bias chamber will build up toward the inlet pressure. This will balance the static fluid pressures on opposite ends of the piston element and the bias spring will move the element down toward and finally against the inlet seat 24. As soon as this occurs, the cross-sectional area of cylinder 27 is larger than the cross-sectional area within the inlet seat. Therefore, there is a differential force tending to hold the valve in its closed condition and this will exist even though there may be no continuing bias spring pressure.

Now it will be assumed that the tank is full, and that a cycle of operation of the ballcock valve is about to be started. Such a cycle is ordinarily caused by tripping a dump valve which will cause the contents of the tank to be discharged into a commode. At such a time, the float will move down, following the surface of the water and will finally assume its lowermost position, which will be determined by a stop 107. At this time, the pressure in the bias chamber will force the valve plunger upward to open the vent port, and water from the bias chamber will flow through the vent port along slot 31a to atmosphere, thereby dropping the pressure in the bias chamber while pressure in the flow chamber rises toward system pressure. Actually, this opening of the vent port occurs as soon as the arm moves far enough to permit the plunger to rise off the seat. The piston element will be moved upwardly until complimentary shoulders 56 and 57 abut each other. This will close the flow passage around the outside of the piston element into the bias chamber and keep particulate matter out of it.

Water will now flow from the inlet pipe into the flow chamber and out through the outlet port down the hush tube and into the tank. Because the restricted passages 73 cause water to back up somewhat the hush tube is filled and some water will flow out through fill tube 71 to the commode during this cycle. Finally, the dump valve is closed and the water flowing through the ballcock valve fills the tank and the float is again lifted up to its closed position where the vent port is closed and pressure builds up in the bias chamber so as to move the piston element down and close the valve. Water from the fill tube filling the commode.

The water level at which shutoff occurs can be determined by adjusting the angularity between the two portions of the control arm at knuckle 83. It will be noted that the wire 86 will wiggle during flow through the valve and this keeps bias port 59 clear of particulate matter.

The foregoing describes a full cycle of both of the valves of FIGS. 1 and 4. The difference between the two valves resides principally in the antisiphon means. When water flows from the flow chamber through the outlet ports to the hush tube, the skirt 69 will be stretched so that water flows between it and the body. This same stretching action will close air ports 68. However should siphoning action result, which might for example be derived from a cutting of the supply pipe at a level below that of the water tank, there would be a lower pressure in the inlet pipe than in the hush tube. Under such circumstances, this negative pressure would cause the skirt to shrink upon the body and open the air ports 68 which would break any siphoning action.

This invention is particularly improved by the piston element and certain of its improvements now will be described having the operation of the device in mind as aforesaid.

There are two critical points in the valve which can give especial trouble in operation, and these have required considerable refinement in order to provide the reliable valve which is disclosed herein. One of these troublesome parts is that which is customarily taken for granted in ballcock valves, namely inlet seal 52. It will be noted that in this device it is simply a flat cylindrically shaped annular washer. It may be made of any suitable rubberlike material. However, a number of problems arise if only the routine considerations of the art are applied, and these difficulties are illustrated in FIG. 7. In FIG. 7, an inlet pipe 110 having an inlet seat 111 is shown abutting a washer 112 held in a groove 113 in the end of a poppet 114. It is conventional practice in such devices to move the inlet seat inwardly toward the central axis as close as possible. This has proved to be a tremendous disadvantage in this device leading to accelerated wear and erratic operation. There are two reasons. One is illustrated in FIG. 7 which shows what occurs when fluid under pressure creeps under and back of the washer so that it moves the washer away from the base of the groove and leaves a peripheral space 115. This causes a deleterious rubbing wear between the inlet seat and the face of the seal. Furthermore, the curling causes and is exposed to a rapid flow with an abrupt change of direction just when the valve is opening, which results in erosion at point 116 which speedily destroys the seal.

This situation is overcome as shown in FIG. 6 by moving the inlet seat contact point 120 outwardly substantially adjacent to the outer perimeter of the seat. Then the downward force on the poppet presses the inlet seal between the poppet and the inlet seat and prevents the curling action. Even if fluid under pressure does leak beneath the inlet seal, it is still highly unlikely that there will be any curling at the outer edge. Furthermore, it will be seen that there is no substantial downward flow in the sense of change of direction at a medial point of the seal. Instead, the change of direction downwardly occurs radially outward therefrom. Accordingly, placing the inlet seat at the outer edge of the inlet seal results in greatly increased life for the washer, overcoming the disadvantages of prior art shown in FIG. 7.

Another serious problem inherent in devices of this type occurs if and when cups such as cup-shaped flange member 54 permit leakage past their fluid sealing edge. If fluid under pressure leaks from the bias chamber past the trailing edge 55 of the flange member into the flow chamber (which is at atmospheric pressure when the valve is closed), then the piston element can move upwardly just as though vent port 29 had been opened. Such a motion restores the pressure for a moment in the flow chamber and the situation is reversed and such a valve will actually engage in automatic cycling operation every 2 or 3 seconds. This explains in large part why this class of valve has not been in usage. It has been discovered that the problem with such an arrangement is caused by the situation schematically illustrated in FIG. 8.

In FIG. 8 a cup-shaped flange member 125 is shown held in a groove 126 in a stem 127, and resting upon a base member 128. Although it is not shown as such in the drawings, there will be a small channel of seepage flow past the outer wall of base member 128 along cylinder wall 129. It is the function of the cup-shaped flange member to prevent interconnection between this region and bias chamber 130. Although it is relatively rather difficult to portray, pressure inside the cup will tend to force region 131 radially outward. Surprisingly, the result is a peeling upward of the bottom of the flange member. This raising of the heel 132 will permit the inward movement of the trailing edge 133 and make possible the undesirable flow between the bias chamber and the region between the cylinder wall and base member causing the said cycling operation.

Such a condition is prevented in the valve of FIG. 6 by a rim 134 which is formed atop the base member and surrounds and is in close proximity with heel 135 of flange member 54. The cup-shaped flange member makes a tight fit in retention groove 50 and also a tight fit inside the rim. The rim prevents radial outward movement of the heel of the flange member and thereby prevents the condition shown in FIG. 8. With such a construction, the device has been found to be entirely reliable, and there is no substantial seepage past the edge of the cup-shaped member.

The material of which the cup-shaped flange members are made in the two devices is preferably ethylene propylene, which is flexibly adaptable to irregularities in surface contours of the cylinders along which they rub. There is, of course, an element of frictional resistance to sliding and for this reason, the cup-shaped member preferably feathers to a relatively sharp edge which is not more than about 0.010 inches diameter greater than the cylinder 27 on diameter. This close tolerance dictates that there should be no problems with sealing such as described in FIG. 8 and it has been found that the rim has overcome such problems and permits the use of lesser interference fits than is customary with such packings, and the system pressure needed to work the valve thereby reduced.

Another problem which has prevented the extensive use of poppet actuated ballcocks in the past has related to the low system pressures which are often available. The system pressures are often insufficient either to open or close the valves unless the differential areas are made quite large thereby enlarging the valves. As to opening, this has been corrected by providing skirt 140 surrounding the inlet seal. This skirt is directed downwardly and overhangs the inlet seat and is directly adjacent to it. It forms an open-mouthed cavity 141 facing the inlet seat. When the piston element just moves off the inlet seat, full system pressure tends to be trapped across the entire lower face of the piston element by the annular recess 141 formed by the chamber. This has a larger area than the area in the bias chamber and assists the speedy lifting of the piston element so that a quick action is obtained even at low system pressures.

It will also be noted that this piston element is readily reached for servicing by separating the parts of the body from one another and taking it out as a unit. It may readily be replaced as such or it may be repaired by taking it apart by pulling off the flange member 54, pulling the stem out of the body, and then replacing the inlet seal, forcing the stem back into the body and using an insertion tool forcing a new flange member into the retention groove 50 inside the rim. This is all the servicing that is required in this valve, and it is readily accomplished by virtue of its simple construction.

The piloting operating of the device requires only a moderate operating force and obviates the need for large elements or long lever arms for actuation because it requires only the overcoming of the relatively small force exerted by bias chamber pressure over the small area of the vent port. The device is readily cast in its entirety from plastic material, except for the springs, wires and seals, which are extremely simple components themselves. It is reliable in service. Its wide-opening feature, involving piston travels on the order of three-sixteenth inch gives a wide quick opening together with a quick shutting operation and thereby overcomes many of the dithering and undesired automatic cycling features of the prior art which have tended to render devices of this class unsuccessful, together with unfavorable flow patterns which in the prior art have quickly destroyed the function of important parts of the valve.

This invention is not to be limited by the embodiments shown in the drawings and described in the description which are given by way of example and not of limitation, but only in accordance with the scope of the appended claims.

We claim:

1. A ballcock valve comprising: an inlet pipe; an inlet seat fixed to and terminating said inlet pipe and having a sealing plane lying normal to an axis of the valve; a body attached to the inlet pipe having an internal cavity in fluid communication with the inlet seat; a cylindrical wall axially aligned with said axis and bounding a portion of said cavity; a piston element making a sliding fluid sealing contact with said cylindrical wall so as to move axially toward and away from the inlet seat, the piston element dividing the cavity into a flow chamber and a bias chamber, the flow chamber being on the side of the piston closer to the inlet seat and the bias chamber being on the opposite side therefrom, the piston element comprising a base member having a hole therethrough, a stem passing through the hole and having a peripheral retention groove therein, a head on the stem, a ring groove in the base member facing the inlet port, the inlet seal embracing the stem and being held in the ring groove by the head on the stem, a cup-shaped flange member having a central hole therein through which the stem is passed, the flange member thereby being engaged in the peripheral groove, and an outwardly tapering wall having a trailing edge contacting the said cylindrical wall to make the said sliding fluid sealing contact; an inlet seal carried by said piston element adapted to make a fluid sealing closure with the inlet seat in one position, thereby to close the valve to flow from the inlet pipe and to be moved away from the same to another position to permit said flow; a vent port passing through the body and entering the bias chamber; control means adapted to close and to open said vent port; an outlet port through the body from the flow chamber; and a bias port fluidly interconnecting the bias chamber to the flow chamber at all times, the cross-sectional area of that portion of the control chamber bounded by the cylindrical wall being greater than the cross-sectional area of the inlet seat.

2. A ballcock valve according to claim 1 in which a peripheral skirt overhangs and surrounds the ring groove extending axially beyond the inlet seal to form a recess facing the inlet seat.

3. A ballcock valve according to claim 1 in which the flange member has a heel adjacent to the tapering wall, and in which a rim on the base member surrounds and contiguously embraces the heel so as to prevent radial outward movement of the heel.

4. A ballcock valve according to claim 3 in which a peripheral skirt overhangs and surrounds the ring groove, extending axially beyond the inlet seal to form a recess at the inlet seal.

5. A ballcock valve according to claim 4 in which an elastic antisiphon skirt is attached to the body upstream of the outlet port, extends axially to a region downstream therefrom where it makes an elastic peripheral seal, and in which an air port passes through the wall of the hush tube adjacent to the skirt, whereby the antisiphon sleeve in its relaxed condition prevents fluid flow from the hush tube into the flow chamber and in the presence of a lesser pressure in said flow chamber than in the hush tube opens the air port to admit air into the hush tube.

6. A ballcock valve comprising: an inlet pipe; an inlet seat fixed to and terminating said inlet pipe and having a sealing plane lying normal to an axis of the valve; a body attached to the inlet pipe having an internal cavity in fluid communication with the inlet seat; a cylindrical wall axially aligned with said axis and bounding a portion of said cavity; a piston element making a sliding fluid sealing contact with said cylindrical wall so as to move axially toward and away from the inlet seat, the piston dividing the cavity into a flow chamber and a bias chamber, said piston element comprising a base member having a hole therethrough, a stem passing through the hold, a peripheral retention groove in the stem, a ring seat in the base member facing the inlet port, an outwardly extending chamber at the outer wall of the ring seat, a cup-shaped flange member retained in said retention groove and tapering axially outwardly therefrom to make the sliding fluid seal with the cylindrical wall and a bias port passing through the stem from end to end, the flow chamber being on the side of the piston closer to the inlet seat and the bias chamber being on the opposite side therefrom; a seal carried in the ring seat and adapted to make a fluid sealing closure with the inlet seat in one position, thereby to close the valve to flow from the inlet pipe and to be moved away from the same to another position to permit said flow; a vent port passing through the body and entering the bias chamber; control means adapted to close and to open said vent ports; an outlet port from the flow chamber through the body, the bias port fluidly interconnecting the bias chamber to the flow chamber at all times, the cross-sectional area of that portion of the control chamber bounded by the cylindrical wall being greater than the cross-sectional area of the inlet seat, and complementary engagement means on the body and on the base member which limit the travel of the piston element away from the inlet seat.

7. A ballcock valve according to claim 6 in which a bias spring is placed within the bias chamber and is disposed between the piston element and the body, the bias spring being of such length as not to exert bias force when the valve is closed, but to exert the same over a range of piston element positions when the valve is open.

8. A ballcock valve according to claim 7 in which the control means comprises a moveable plug adapted to seal the vent port, and an actuator means responsive to water level to move said plug to close the vent port or to move away from it to permit it to open, said actuator means comprising a lever mounted to the valve with a float thereon.

9. A ballcock valve according to claim 7 in which the body portions are engaged to each other by a bayonet coupling.

10. A ballcock valve according to claim 6 in which the inlet seat makes mechanical contact with the inlet seal adjacent to a radially outermost boundary of its sealing face, whereby the seal's outer edge is mechanically compressed between the piston element and the inlet seat when the ballcock valve is closed to flow, and in which a peripheral outwardly tapered skirt overhangs and surrounds the inlet seal, extending away from the seal surface as it extends toward the inlet seat.

11. A ballcock valve according to claim 10 in which an annular open region surrounds the piston element in the flow chamber, and the outlet port opens into the said region.

12. A ballcock valve according to claim 6 in which the body and the piston element carry fully peripheral complementary engagement means which limit the travel of the piston element away from the inlet seat and make a surface-to-surface engagement in the fully open position to resist the flow of particulate matter past their junction.

13. A piston element for the piloted actuation of a ballcock valve comprising: a base member having a hole therethrough, a stem passing through the hole, a peripheral retention groove in the stem, a ring seat in the base member facing a inlet port, an outwardly extending chamber at the outer wall of the ring seat, a cup-shaped flange member retained in said retention groove and having an outer wall tapering axially outwardly therefrom to make a sliding fluid seal with a cylindrical wall, a bias port passing through the stem from end to end, and an annular seal fitting in said ring seat and held in place by the stem.

14. A piston element according to claim 13 in which the flange member has a heel adjacent to its tapered outer wall, and in which a rim on the base member surrounds and contiguously embraces the heel so as to prevent radial outward movement of the heel.

15. A piston element according to claim 14 in which a peripheral skirt overhangs and surrounds the ring groove, extending axially and tapering beyond the inlet seal to form an open recess facing away from the base member.

16. A piston element according to claim 13 in which a peripheral skirt overhangs and surrounds the ring groove, extending and tapering axially outwardly beyond the inlet seal to form an open recess facing away from the base member.

17. A ballcock valve comprising: an inlet pipe; an inlet seat fixed to and terminating said inlet pipe and having a sealing plane lying normal to an axis of the valve; a body attached to the inlet pipe having an internal cavity in fluid communication with the inlet seat; a cylindrical wall axially aligned with said axis and bounding a portion of said cavity; a piston element making a sliding fluid sealing contact with said cylindrical wall so as to move axially toward and away from the inlet seat, the piston dividing the cavity into a flow chamber and a bias chamber, the flow chamber being on the side of the piston closer to the inlet seat and the bias chamber being on the opposite side therefrom; an inlet seal carried by said piston element adapted to make a fluid sealing closure with the inlet seat in one position, thereby to close the valve to flow from the inlet pipe and to be moved away from the same to another position to permit said flow; a vent port passing through the body and entering the bias chamber; control means adapted to close and to open said vent port; an outlet port through the body from the flow chamber; a bias port fluidly interconnecting the bias chamber to the flow chamber at all times, the cross-sectional area of that portion of the control chamber bounded by the cylindrical wall being greater than the cross-sectional area of the inlet seat; and a bias spring within the bias chamber, disposed between the piston element and the body, the bias spring being of such free length as not to exert bias force when the valve is closed, but to exert the same over a range of piston element positions when the valve is open.

18. A ballcock valve comprising: an inlet pipe; an inlet seat fixed to and terminating said inlet pipe and having a sealing plane lying normal to an axis of the valve; a body attached to the inlet pipe having an internal cavity in fluid communication with the inlet seat; a cylindrical wall axially aligned with said axis and bounding a portion of said cavity; a piston element making a sliding fluid sealing contact with said cylindrical wall so as to move axially toward and away from the inlet seat, the piston dividing the cavity into a flow chamber and a bias chamber, the flow chamber being on the side of the piston closer to the inlet seat and the bias chamber being on the opposite side therefrom; an inlet seal carried by said piston element adapted to make a fluid sealing closure with the inlet seat in one position, thereby to close the valve to flow from the inlet pipe and to be moved away from the same to another position to permit said flow, the inlet seat making mechanical contact with the inlet seal adjacent to a radially outermost boundary of its sealing face, whereby the seal's outer edge is mechanically compressed between the piston element and the inlet seat when the ballcock valve is closed to flow; a peripheral outwardly tapered skirt overhangs and surrounds the inlet seal, extending away from the seal surface as it extends toward the inlet seat; a vent port passing through the body and entering the bias chamber; control means adapted to close and to open said vent port; an outlet port through the body from the flow chamber; and a bias port fluidly interconnecting the bias chamber to the flow chamber at all times, the cross-sectional area of that portion of the control chamber bounded by the cylindrical wall being greater than the cross-sectional area of the inlet seat.

19. A ballcock valve comprising: an inlet pipe; an inlet seat fixed to and terminating said inlet pipe and having a sealing plane lying normal to an axis of the valve; a body attached to the inlet pipe having an internal cavity in fluid communication with the inlet seat; a cylindrical wall axially aligned with said axis and bounding a portion of said cavity; a piston element making a sliding fluid sealing contact with said cylindrical wall so as to move axially toward and away from the inlet seat, the piston dividing the cavity into a flow chamber and a bias chamber, the flow chamber being on the side of the piston closer to the inlet seat and the bias chamber being on the opposite side therefrom; an inlet seal carried by said piston element adapted to make a fluid sealing closure with the inlet seat in one position, thereby to close the valve to flow from the inlet pipe and to be moved away from the same to another position to permit said flow; a vent port passing through the body and entering the bias chamber; control means adapted to close and to open said vent port; an outlet port through the body from the flow chamber; a bias port fluidly interconnecting the bias chamber to the flow chamber at all times, the cross-sectional area of that portion of the control chamber bounded by the cylindrical wall being greater than the cross-sectional area of the inlet seat; and fully peripheral complementary engagement means on the body and on the piston element which limit the travel of the piston element away from the inlet seat and make a surface-to-surface engagement in the fully open position to resist the flow of particulate matter past their junction.

20. A ballcock valve according to claim 19 in which the inlet seat makes mechanical contact with the inlet seal adjacent to a radially outermost boundary of its sealing face, whereby the seal's outer edge is mechanically compressed between the piston element and the inlet seat when the ballcock valve is closed to flow, and in which a peripheral outwardly tapered skirt overhangs and surrounds the inlet seal, extending away from the seal surface as it extends toward the inlet seat.

* * * * *

UNITED STATES PATENT OFFICE
CERTIFICATE OF CORRECTION

Patent No. __3,618,629__ Dated __November 9, 1971__

Inventor(s) __WILLIAM T. HEYER and DALE F. SOUKUP__

It is certified that error appears in the above-identified patent and that said Letters Patent are hereby corrected as shown below:

Col. 2, line 38, change "adapted" to --adapter--

Col. 3, line 16, before "base" insert --a ring seat (sometimes called a "ring groove") in--

Col. 3, line 62, change "41" to --42--

Col. 3, line 73, change "skirt", second occurrence, to --to--

Col. 5, line 12, change "Antunex" to --Antunez--

Col. 7, line 58, change "cavity" to --recess--

Col. 7, line 61, change "by" to --in--

Col. 7, line 62, cancel "formed by the chamber"

Claim 1 (Col. 8, line 37), change "the" before inlet to --an--

Claim 1 (Col. 8, line 44), change "an" to --the--

Claim 1 (Col. 8, line 52), change "flow chamber" to --inlet pipe--

Claim 1 (Col. 8, lines 53-54), change "control" to --bias--

Claim 6 (Col. 9, line 14), change "hold" to --hole--

Claim 6 (Col. 9, line 17), change "chamber" to --recess--

Claim 6 (Col. 9, line 24), change "a" to --an inlet--

Claim 6 (Col. 9, line 32), change "flow chamber" to --inlet pipe--

Claim 6 (Col. 9, line 33), change "control" to --bias--

: PO-1050
(5/69)

UNITED STATES PATENT OFFICE
CERTIFICATE OF CORRECTION

Patent No. 3,618,629  Dated November 9, 1971

Inventor(s) WILLIAM T. HEYER and DALE F. SOUKUP  PAGE - 2

It is certified that error appears in the above-identified patent and that said Letters Patent are hereby corrected as shown below:

Claim 13 (Col. 9, line 73), cancel "facing a inlet port"

Claim 13 (Col. 9, line 74), change "chamber" to --recess--

Claim 15 (Col. 10, line 12), change "inlet" to --annular-- same line, after "tapering" insert --outwardly--

Claim 15 (Col. 10, lines 12-13), change "an open" to --the said--

Claim 16 (Col. 10, line 16), change "inlet" to --annular--

Claim 16 (Col. 10, line 17), change "an open" to --the said--

Claim 17 (Col. 10, line 38), change "flow chamber" to --inlet pipe--

Claim 17 (Col. 10, line 39), change "control" to --bias--

Claim 18 (Col. 10, line 72), change "flow chamber" to --inlet pipe--

Claim 18 (Col. 10, line 73), change "control" to --bias--

Claim 19 (Col. 12, line 1), change "flow chamber" to --inlet pipe--

Claim 19 (Col. 12, line 2), change "control" to --bias--

IN THE DRAWINGS:

Fig. 6 (sheet 2), change number "120" to --141--, and change number "141" to --120--

Signed and sealed this 4th day of July 1972.

(SEAL)
Attest:

EDWARD M. FLETCHER, JR.
Attesting Officer

ROBERT GOTTSCHALK
Commissioner of Patents